C. H. Brown,
Making Hoops.
Nº 16,225.   Patented Dec. 16, 1856.
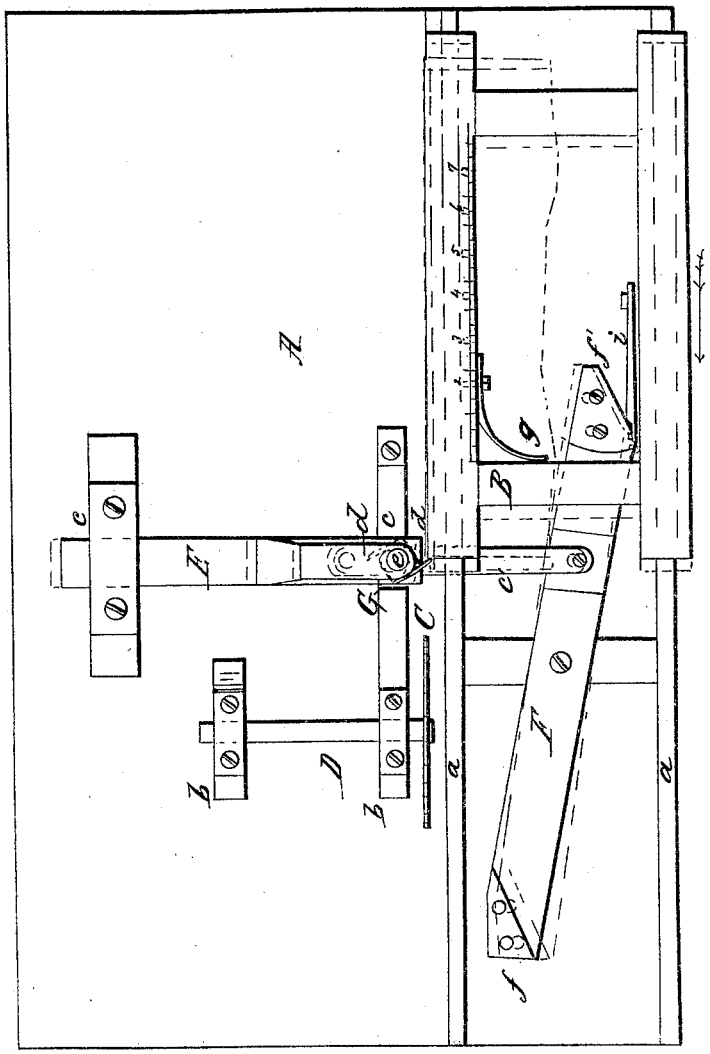

UNITED STATES PATENT OFFICE.

CLARK H. BROWN, OF FOREST PORT, NEW YORK.

METHOD OF PLANING AND TAPERING WOODEN HOOPS.

Specification of Letters Patent No. 16,225, dated December 16, 1856.

*To all whom it may concern:*

Be it known that I, CLARK H. BROWN, of Forest Port, in the county of Oneida and State of New York, have invented a new and Improved Machine for Cutting, Planing, and Tapering Strips for the Hoops of Barrels, Cheese-Boxes, &c.; and I do hereby declare that the following is a full, clear, and exact description of the same, reference being had to the annexed drawings, making a part of this specification, in which—

Figure 1, is a plan or top view of my improvement. Fig. 2, is a detached side view of the lever and the arm on the carriage by which the rotary planer is adjusted.

Similar letters of reference indicate corresponding parts in the two figures.

My invention consists in the employment or use of a circular saw and an adjustable or sliding rotary planer operated as will be hereinafter fully shown and described.

To enable those skilled in the art to fully understand and construct my invention, I will proceed to describe it.

A, represents a bed or platform on which two parallel ways $a$, $a$, are placed and B, is a carriage which is fitted on said ways, and allowed to work freely back and forth thereon.

C, is a circular saw placed on an arbor D, which has its bearings in uprights $b$, $b$, on the bed A. The saw C, is placed near the inner way $a$, on the bed.

E, represents a slide which is fitted and works in guides $c$, on the bed A. This slide is placed at right angles with the ways $a$, $a$ and its front end is connected by an arm $c^1$ with a lever F, which is pivoted at about its center to the bed A, between the two ways $a$ $a$.

To the slide E, a vertical rotary planer G, is attached. The planer is formed of two cutters $d$, $d$, attached to a head $e$, which may be secured to the slide in any proper manner, the head being allowed to rotate.

To each end of the lever F, an oblique or beveled projection is placed. These projections are similar to each other, the projection $f$, being at the front and the projection $f^1$, at the back end of the lever.

To the inner end of the carriage B, and at one side a pendent $g$, is attached by a screw $h$. This pendent may be secured at varying points in the carriage. To the opposite side of the carriage an arm $i$, is pivoted, shown in both figures.

The operation is as follows:—The "bolt," shown in blue, Fig. 1 is got out the proper length and is placed on the carriage B, the inner end of the bolt being even with the inner end of the carriage. The carriage B, is then moved along, by any proper feed movement, in the direction indicated by arrow 1. The planer G, as the carriage is thus moved, is quite close to the bolt and consequently makes a deep cut at its commencement, but the arm $i$, immediately strikes against the projection $f^1$, and moves the lever F, and the slide E, and planer G, are gradually thrown back a certain distance. This movement of the planer causes the inner end of the "bolt" to be cut in taper form; the saw C, now enters the "bolt" and cuts a strip of the necessary width from it, the planer G being now stationary as regards its lateral or sliding movement, but rotating and planing the side of the bolt which is of course the outer side of the strip when sawed off from the "bolt." As the outer end of the bolt approaches the planer, and at the proper point, the pendent $g$, strikes the projection $f$, on the opposite end of the lever F, and the planer is moved gradually inward so as to cut the outer end of the "bolt" in taper form.

Thus it will be seen that as each strip is sawed from the bolt its outer side is planed and its ends are cut in taper or beveled form so that they may be overlapped to form the lock of the hoop.

The pendent is secured to the carriage at different points according to the size or diameter of the hoops required, and a scale may be made on the carriage to serve as a guide in adjusting the pendent. This is important, because if the strips vary in length the slide and planer must be moved at the proper time in order to insure the ends of the strips being cut in taper form.

The above machine has been practically tested and operates well. It may be constructed at a small cost, and much labor is saved by its use. The saw and planer may be driven by belts arranged in any proper way.

I do not claim the circular saw and rotary planer, for they have been previously used for similar or analogous purposes, but

Having thus described my invention, what I claim as new and desire to secure by Letters Patent, is—

The combination of the saw C, and the adjustable or sliding planer G, operated or adjusted by the movement of the carriage B, through the medium of the lever F, and the pendent g, and arm i, on the carriage B, substantially as shown and described for the purpose set forth.

CLARK H. BROWN.

Witnesses:
A. N. Hough,
J. M. Abbott.